United States Patent
Maeda

(10) Patent No.: US 7,640,441 B2
(45) Date of Patent: Dec. 29, 2009

(54) COMMUNICATION APPARATUS

(75) Inventor: Tadaaki Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 488 days.

(21) Appl. No.: 11/693,516

(22) Filed: Mar. 29, 2007

(65) Prior Publication Data

US 2007/0240004 A1 Oct. 11, 2007

(30) Foreign Application Priority Data

Apr. 10, 2006 (JP) ............................. 2006-107717

(51) Int. Cl.
*G06F 1/26* (2006.01)

(52) U.S. Cl. .................. 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 2002/0125867 A1* | 9/2002 | Choo et al. ................. | 323/282 |
| 2004/0029527 A1* | 2/2004 | Endo .......................... | 455/11.1 |
| 2004/0127265 A1* | 7/2004 | Van Bosch et al. .......... | 455/574 |
| 2004/0150512 A1* | 8/2004 | Yoshikawa ............. | 340/426.13 |
| 2005/0007628 A1* | 1/2005 | Yamano et al. ............ | 358/1.15 |
| 2007/0097715 A1* | 5/2007 | Choi ........................... | 363/24 |
| 2007/0130479 A1* | 6/2007 | Price et al. .................. | 713/300 |
| 2007/0171606 A1* | 7/2007 | Iwai ............................ | 361/685 |
| 2007/0207841 A1* | 9/2007 | Amerga et al. .............. | 455/574 |

FOREIGN PATENT DOCUMENTS

JP    2001-154763 A    6/2001

* cited by examiner

*Primary Examiner*—Abdelmoniem Elamin
(74) *Attorney, Agent, or Firm*—Canon U.S.A., Inc. I.P. Division

(57) ABSTRACT

A printer has a controller configured to give an instruction to a LAN controller, the instruction specifying which one of communication speeds the LAN controller should communicate at. When it is determined that the mode of the printer is changed from a power mode in which power is supplied to the controller to a power mode in which power is not supplied to the controller, the controller instructs the LAN controller to reduce the communication speed. After the instruction to reduce the communication speed is given, a power supply unit cuts off power supply to the controller.

11 Claims, 5 Drawing Sheets

COMMUNICATION APPARATUS

BACKGROUND OF THE INVENTION

1. Field of the Invention

The present invention relates to communication apparatuses.

2. Description of the Related Art

A Network Interface Card (hereinafter referred to as "NIC") has been commonly used in a communication apparatus to allow the communication apparatus to communicate with another communication apparatus via a network such as a local area network (LAN). The NIC is a board connected to the communication apparatus via, for example, a bus and provides the function of connecting the communication apparatus via a network cable to the other communication apparatus.

Ethernet® is known as a typical network standard. Ethernet® protocols include 10BASE-T for a data transfer rate of 10 Mbps, and 100BASE-TX for a data transfer rate of 100 Mbps. Recently, 1000BASE-T for a data transfer rate of 1000 Mbps is also available.

In recent years, NICs that can communicate at a plurality of communication speeds, such as at 10 Mbps, 100 Mbps, and 1000 Mbps, have been proposed in, for example, Japanese Patent Laid-Open No. 2001-154763.

There has been a recent demand for a reduction in power consumption of communication apparatuses. To reduce the power consumption of a communication apparatus, the communication apparatus preferably enters a power saving mode in which, when part of the communication apparatus is not operating, power supply to that part is cut off.

However, the communication apparatus cannot return from the power saving mode to a normal power mode unless the communication apparatus is able to detect a factor relating to returning from the power saving mode to the normal power mode.

Therefore, when the communication apparatus operates in the power saving mode in which the power consumption thereof is reduced, it is preferable to supply power to a portion that detects a factor relating to returning from the power saving mode, but not to the other portions.

A NIC disclosed in Japanese Patent Laid-Open No. 2001-154763 can reduce its power consumption by reducing the communication speed when the communication apparatus operates in the power saving mode.

When the communication apparatus operates in the power saving mode, it is preferable that no power be supplied to portions other than the portion detecting the factor relating to returning from the power saving mode. However, the NIC disclosed in Japanese Patent Laid-Open No. 2001-154763 is not configured to implement such an operation.

More specifically, the NIC disclosed in Japanese Patent Laid-Open No. 2001-154763 is designed in such a manner that, in the power saving mode, power is supplied even to the portions other than the portion detecting the factor relating to returning from the power saving mode.

SUMMARY OF THE INVENTION

The present invention provides an improved communication apparatus.

The present invention also provides a communication apparatus that reduces its communication speed for communication with another communication apparatus before entering a power saving mode.

The present invention also provides a communication apparatus that achieves a reduction in power consumption by cutting off power supply to a portion that gives an instruction to reduce its communication speed in the power saving mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments, features, and aspects of the invention and, together with the description, serve to explain the principles of the invention.

DESCRIPTION OF THE EMBODIMENTS

The present invention will now be described in detail with reference to the drawings showing various embodiments thereof.

First Exemplary Embodiment

Figure 1:
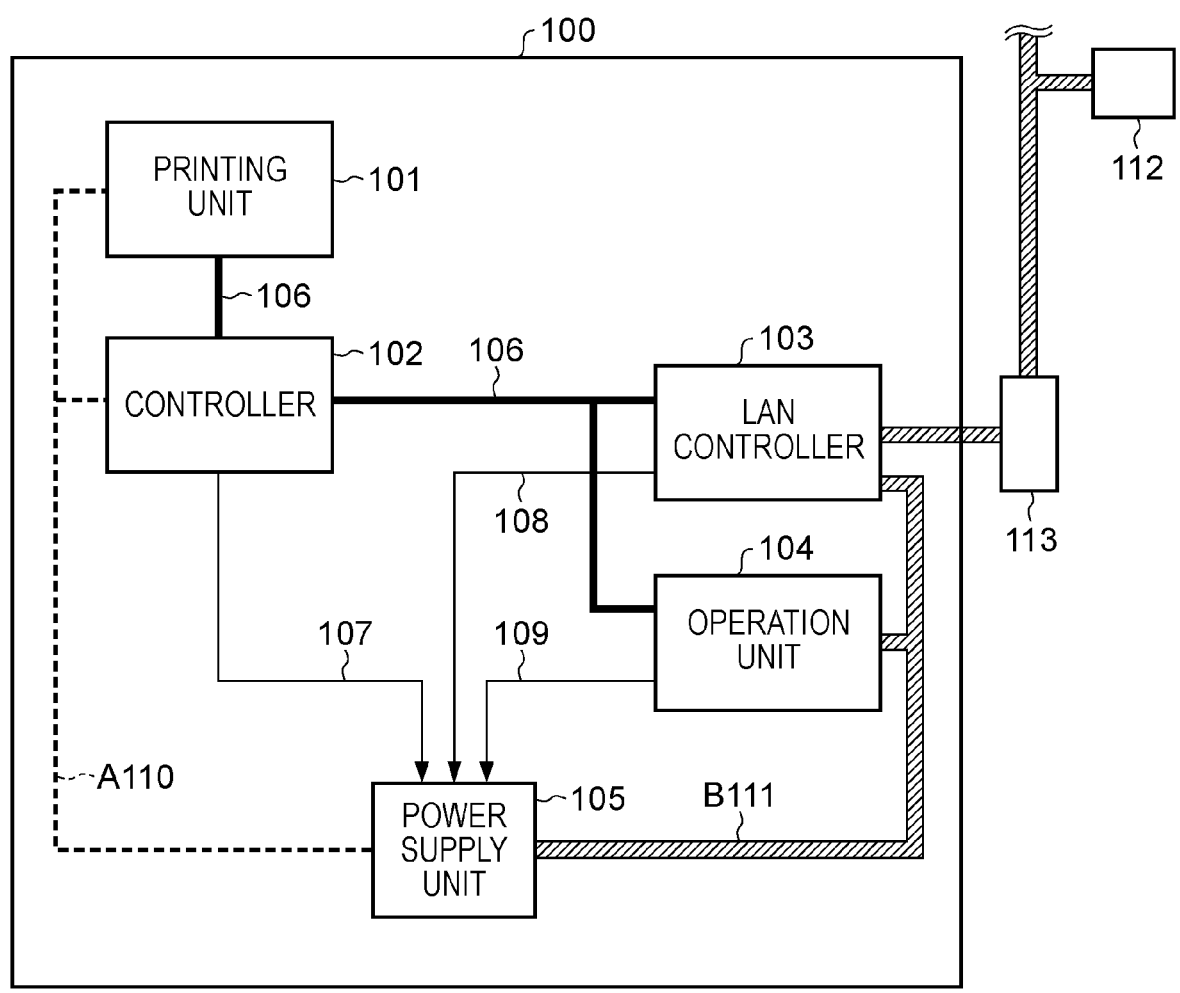
FIG. 1 is a block diagram showing an example structure of a printer according to a first exemplary embodiment of the present invention.

FIG. 1 is a block diagram showing an example structure of a printer 100 according to a first embodiment of the present invention.

Referring to FIG. 1, the printer 100 includes a printing unit 101 configured to print an image on a sheet, a controller 102 configured to control the overall printer 100, and a LAN controller 103 configured to communicate via a LAN with another communication apparatus. The printer 100 further includes an operation unit 104 configured to allow an operator of the printer 100 to enter various pieces of information to operate the printer 100, and a power supply unit 105 configured to supply power to the components of the printer 100. The printer 100 further includes an internal bus 106 such that data can be transmitted and received among the printing unit 101, the controller 102, the LAN controller 103, and the operation unit 104.

The components of the printer 100 will now herein be described in detail below.

[LAN Controller]

The LAN controller 103 can communicate with another communication apparatus 112 via a switching hub 113. The LAN controller 103 according to the first embodiment can communicate at three speeds, namely, 10 Mbps, 100 Mbps, and 1000 Mbps.

The switching hub 113 acts as a network repeater, which can detect the address of data transmitted thereto from the printer 100 by analyzing the data and send the data only to the destination terminal (e.g., the communication apparatus 112). The switching hub 113 can also detect the address of data transmitted thereto from the communication apparatus 112 by analyzing the data and send the data only to the destination terminal (e.g., the printer 100). Since the switching hub 113 temporarily stores data in order to analyze the address, networks at different speeds can be connected to each other via the switching hub 113. For example, when the communication apparatus 112 is an apparatus that can communicate only at a communication speed of 1000 Mbps, the switching hub 113 allows the printer 100 to communicate at any of communication speeds of 10 Mbps, 100 Mbps, and 1000 Mbps. Note that the LAN controller 103 generally sets the highest one of all communication speeds available for both the destination apparatus and the printer 100 to communicate with each other. For example, when the highest communication speed possible for the communication apparatus 112 is 1000 Mbps, the LAN controller 103 sets the communication speed at 1000 Mbps. This is implemented by the LAN controller 103 receiving information indicating that the highest possible communication speed is 1000 Mbps from the communication apparatus 112.

Besides printing data, the LAN controller 103 additionally receives various pieces of data from another communication apparatus such as the communication apparatus 112. For example, the LAN controller 103 may receive a status request from another communication apparatus asking the operating status (e.g., power mode, processing status of printing data, etc.) of the printer 100. When the LAN controller 103 receives these various pieces of data including the status request and the printing data, the LAN controller 103 transfers the data via the internal bus 106 to the controller 102.

[Controller]

The controller 102 controls the overall printer 100. That is, the controller 102 sends commands via the internal bus 106 to the printing unit 101, the LAN controller 103, the operation unit 104, and the power supply unit 105 to control these components.

The controller 102 receives printing data transmitted via the LAN controller 103 from the communication apparatus 112 or the like and analyzes the received printing data. The controller 102 analyzes and converts the printing data into image data that can be printed by the printing unit 101 and transfers the image data to the printing unit 101. In contrast, when the data received from the communication apparatus 112 or the like via the LAN controller 103 is a status request, the controller 102 transfers information about the operating status of each of the components of the printer 100 to the LAN controller 103. The LAN controller 103 sends the information about the operating status of the printer 100 to the destination communication apparatus having made the status request. The controller 102 has a random-access memory (RAM) for storing such information about the operating status of each of the components of the printer 100.

[Printing Unit]

The printing unit 101 executes a printing process on the basis of the image data received from the controller 102. Various methods are applicable to the printing process performed by the printing unit 101. For example, electrophotography is applicable. Electrophotography forms an image on a sheet of paper by forming a toner image on a photoconductive drum on the basis of the image data and transferring the toner image formed on the photoconductive drum onto the sheet. Alternatively, for example, ink-jet printing is applicable. Ink-jet printing forms an image on a sheet by ejecting an ink drop to the sheet on the basis of the image data. The sheet on which the printing unit 101 performs the printing process is fed from a paper feeding cassette (not shown) or the like to the printing unit 101.

[Power Supply Unit]

The power supply unit 105 supplies power to the components (the printing unit 101, the controller 102, the LAN controller 103, and the operation unit 104) of the printer 100. A power cut-off signal 107 is input from the controller 102 to the power supply unit 105. A power supply signal 108 is input from the LAN controller 103 to the power supply unit 105. A power supply signal 109 is input from the operation unit 104 to the power supply unit 105.

The power supply unit 105 supplies power to the components of the printer 100 via two power supply lines. A power supply line A110 is a line for supplying power to the printing unit 101 and the controller 102. When the controller 102 allows the printer 100 to enter a power saving mode, which will be described later, the controller 102 inputs the power cut-off signal 107 to the power supply unit 105 to cut off the power supply to the printing unit 101 and the controller 102 via the power supply line A110.

In contrast, a power supply line B111 is a line for supplying power to the LAN controller 103 and the operation unit 104. Power is supplied via the power supply line B111 to the LAN controller 103 and the operation unit 104 even in the power saving mode.

When the power supply unit 105 receives the power supply signal 108 from the LAN controller 103 in the power saving mode, the power supply unit 105 restarts supplying power to the printing unit 101 and the controller 102 via the power supply line A110, thereby canceling the power saving mode.

When the power supply unit 105 receives the power supply signal 109 from the operation unit 104 in the power saving mode, the power supply unit 105 restarts supplying power to the printing unit 101 and the controller 102 via the power supply line A110, thereby canceling the power saving mode.

[Operation Unit]

The operation unit 104 allows the operator of the printer 100 to enter an instruction for setting the operation of the printer 100. When an instruction is given by the operator in the power saving mode of the printer 100, the operation unit 104 outputs the power supply signal 109 to the power supply unit 105. When the power supply signal 109 is input to the power supply unit 105 in the power saving mode (mode in which power supply to the printing unit 101 and the controller 102 is cut off), the power supply unit 105 restarts supplying power to the printing unit 101 and the controller 102 via the power supply line A110.

[Exemplary Operation of Printer]

Next, an example operation of the printer 100 will be described with reference to FIG. 2.

Figure 2:
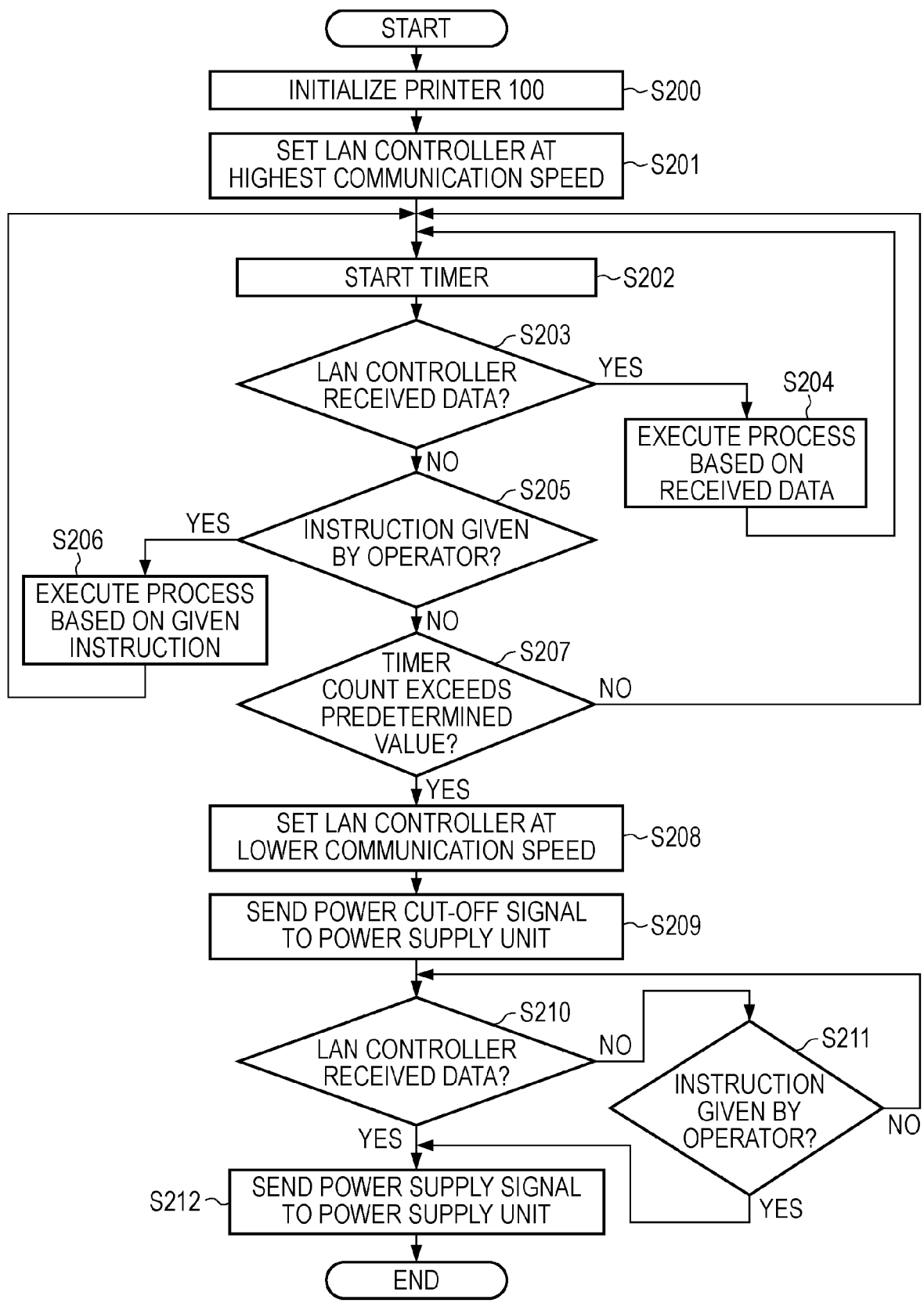
FIG. 2 is a flowchart describing an example operation of the printer according to the first embodiment.

The flowchart shown in FIG. 2 shows the operation performed when the controller 102 executes a control program stored in a read only memory (ROM) (not shown) included in the controller 102. Steps S210 to S212 are performed when power supply to the controller 102 is cut off. The operation in steps S210 to S212 is executed by the LAN controller 103 or the operation unit 104.

Now referring to FIG. 2, the printer 100 starts operating when a power switch (not shown) of the printer 100 is turned on, thereby supplying power from an external commercial power supply (not shown) to the power supply unit 105. After the power switch is turned on, the power supply unit 105 supplies power to the components (the printing unit 101, the controller 102, the LAN controller 103, and the operation unit 104) via the power supply line A110 and the power supply line B111.

Having received power supplied from the power supply unit 105 via the power supply line A110, the controller 102 in step S200 sends, via the internal bus 106, an initialization command for allowing the components of the printer 100 to execute an initialization operation. The components (the printing unit 101, the LAN controller 103, and the operation unit 104) receive the initialization command from the controller 102 via the internal bus 106 and execute the initialization operation.

In step S201, the controller 102 instructs the LAN controller 103 via the internal bus 106 to set the LAN controller 103 at the highest communication speed. Since the LAN controller 103 can perform communication at three speeds, namely, 10 Mbps, 100 Mbps, and 1000 Mbps, the LAN controller 103 is set at 1000 Mbps.

In step S202, the controller 102 starts counting using a timer included in the controller 102. In step S203, the controller 102 determines whether the LAN controller 103 has received data from an external apparatus such as the communication apparatus 112. When the LAN controller 103 has received data, the flow proceeds to step S204. Otherwise, the flow proceeds to step S205.

In step S204, the controller 102 executes a process in accordance with the data received by the LAN controller 103 from the external apparatus such as the communication apparatus 112.

When printing data is received from the communication apparatus 112, the controller 102 executes the following process. At first, the controller 102 analyzes the printing data received via the LAN controller 103 and converts the printing data into image data that can be printed by the printing unit 101. The controller 102 then transfers the image data to the printing unit 101. Having received the image data from the controller 102, the printing unit 101 forms an image on a sheet on the basis of the received image data.

In contrast, when a status request is received from the communication apparatus 112, the controller 102 executes the following process. At first, the controller 102 analyzes the contents of the status request received via the LAN controller 103. When the contents of the status request are requesting transmission of information about the operating status of the printing unit 101, the controller 102 asks the printing unit 101 about the operating status of the printing unit 101. When the controller 102 receives a reply to the inquiry from the printing unit 101, the controller 102 requests the LAN controller 103 to send the received reply to the communication apparatus 112.

After performing step S204, the controller 102 is controlled to return to step S202 and perform step S202 again.

In step S205, the controller 102 determines whether the operator of the printer 100 has given an instruction to the operation unit 104. If such an instruction is given, the flow proceeds to step S206. Otherwise, the flow proceeds to step S207.

In step S206, the controller 102 executes a process in accordance with the contents of the instruction given by the operator of the printer 100 to the operation unit 104. After performing step S206, the controller 102 is controlled to return to step S202 and perform step S202 again.

In step S207, the controller 102 determines whether the value counted by the counter, which has been started in step S202, exceeds a predetermined value. If the counter value exceeds the predetermined value, the flow proceeds to step S208. Otherwise, the flow returns to step S202. The controller 102 performs such determination to allow the printer 100 to enter the power saving mode from a normal power mode. In the normal power mode, power is supplied via the power supply line A110 and the power supply line B111 to the components (the printing unit 101, the controller 102, the LAN controller 103, and the operation unit 104). In the power saving mode, however, power is supplied via the power supply line B111 to the LAN controller 103 and the operation unit 104, although no power is supplied via the power supply line A110 to the printing unit 101 and the controller 102. When the printer 100 does not operate for a predetermined period of time, the mode of the printer 100 is changed from the normal power mode to the power saving mode. This reduces power consumed by the printer 100. When the counter in the controller 102 counts one every minute, and when the above-described predetermined value is set to 15, for example, the operation mode is switched from the normal power mode to the power saving mode when the printer 100 does not operate for 15 minutes.

In step S208, the controller 102 sets the LAN controller 103 at a lower communication speed prior to changing the operation mode of the printer 100 to the power saving mode. As has been described above, the LAN controller 103 can communicate at three speeds, namely, 10 Mbps, 100 Mbps, and 1000 Mbps. In contrast, the higher the communication speed set for the LAN controller 103, the higher the power consumption. In the normal power mode, the time required to receive data (e.g., printing data) from the communication apparatus 112 is reduced when the LAN controller 103 is set at a high communication speed, which contributes to increasing the operation speed. In the power saving mode, however, such a high communication speed requires higher power consumption, which causes adverse effects on saving power.

In step S208, the controller 102 instructs the LAN controller 103 via the internal bus 106 to change the setting of the communication speed of the LAN controller 103 from 1000 Mbps in the normal power mode to 100 Mbps in the power saving mode. Having received the instruction to change the speed from the controller 102, the LAN controller 103 changes the communication speed from 1000 Mbps to 100 Mbps.

More specifically, when the LAN controller 103 receives the instruction from the controller 102 to change the speed from 1000 Mbps to 100 Mbps, the LAN controller 103 requests the switching hub 113 to break a communication link at the current communication speed (1000 Mbps). When the LAN controller 103 determines that the communication link at 1000 Mbps with the switching hub 113 is broken, the LAN controller 103 requests the switching hub 113 to establish a new communication link at 100 Mbps. With this operation, the speed of communication between the LAN controller 103 and the switching hub 113 is changed from 1000 Mbps to 100 Mbps.

In step S209, the controller 102 sends the power cut-off signal 107 to the power supply unit 105 to change the mode of the printer 100 from the normal power mode to the power saving mode. Having received the power cut-off signal 107 from the controller 102, the power supply unit 105 stops supplying power to the printing unit 101 and the controller 102 via the power supply line A110.

To reduce power consumption in the power saving mode, the printer 100 according to the first embodiment even cuts off power supply to the controller 102, which is configured to control the overall printer 100. The printer 100 according to the first embodiment reduces power consumption by reducing the communication speed of the LAN controller 103 in the power saving mode. In this manner, to achieve a reduction in power consumption of both the controller 102 and the LAN controller 103, the controller 102 changes the communication speed of the LAN controller 103 in step S208 and then sends the power cut-off signal 107 in step S209. For example, when the controller 102 tries to perform step S209 prior to step S208, power supply to the controller 102 is cut off in step S209, and hence, the controller 102 cannot perform step S208. According to the first embodiment, a reduction in power consumption of both the controller 102 and the LAN controller 103 in the power saving mode can be achieved.

After the printer 100 enters the power saving mode, it is determined whether a condition for the printer 100 to return from the power saving mode to the normal power mode is satisfied.

Specifically, when the LAN controller 103 receives data from the external apparatus such as the communication apparatus 112 in step S210, the flow proceeds to step S212. Otherwise, the flow proceeds to step S211.

When the LAN controller 103 receives an instruction given by the operator of the printer 100 to the operation unit 104 in step S211, the flow proceeds to step S212. Otherwise, the flow returns to step S210.

In step S212, the LAN controller 103 or the operation unit 104 sends the power supply signal 108 or the power supply signal 109 to the power supply unit 105. The power supply unit 105 receives the power supply signal 108 or the power supply signal 109 and restarts supplying power to the printing unit 101 and the controller 102 via the power supply line A110. This flow ends here, and a new flow starts. Specifically, after a request to restart supplying power to the controller 102 is made in step S212, the flow from step S200 onward is performed again. That is, the controller 102 changes the communication speed, which has been set to the low speed (100 Mbps) in the power saving mode, to the high speed (1000 Mbps) in accordance with the fact that the printer 100 has returned to the normal power mode (S201). More specifically, when the LAN controller 103 receives an instruction from the controller 102 to change the speed to 1000 Mbps, the LAN controller 103 requests the switching hub 113 to break a communication link at the current communication speed (100 Mbps). When the LAN controller 103 determines that the communication link with the switching hub 113 at 100 Mbps is broken, the LAN controller 103 requests the switching hub 113 to establish a new communication link at 1000 Mbps. With this operation, the speed of communication between the LAN controller 103 and the switching hub 113 is changed from 100 Mbps to 1000 Mbps.

As has been described above, according to the first embodiment, when it is determined to change the mode from the normal power mode to the power saving mode, the controller 102 gives an instruction to the LAN controller 103 to reduce the communication speed. After that, the power supply unit 105 cuts off power supply to the controller 102.

Accordingly, before the mode is changed to the power saving mode, the communication speed for communicating with the other communication apparatus is reduced to a lower speed. In the power saving mode, the power consumption can be minimized by cutting off power supply to a portion that gives an instruction to reduce the communication speed.

Second Exemplary Embodiment

Figure 3:
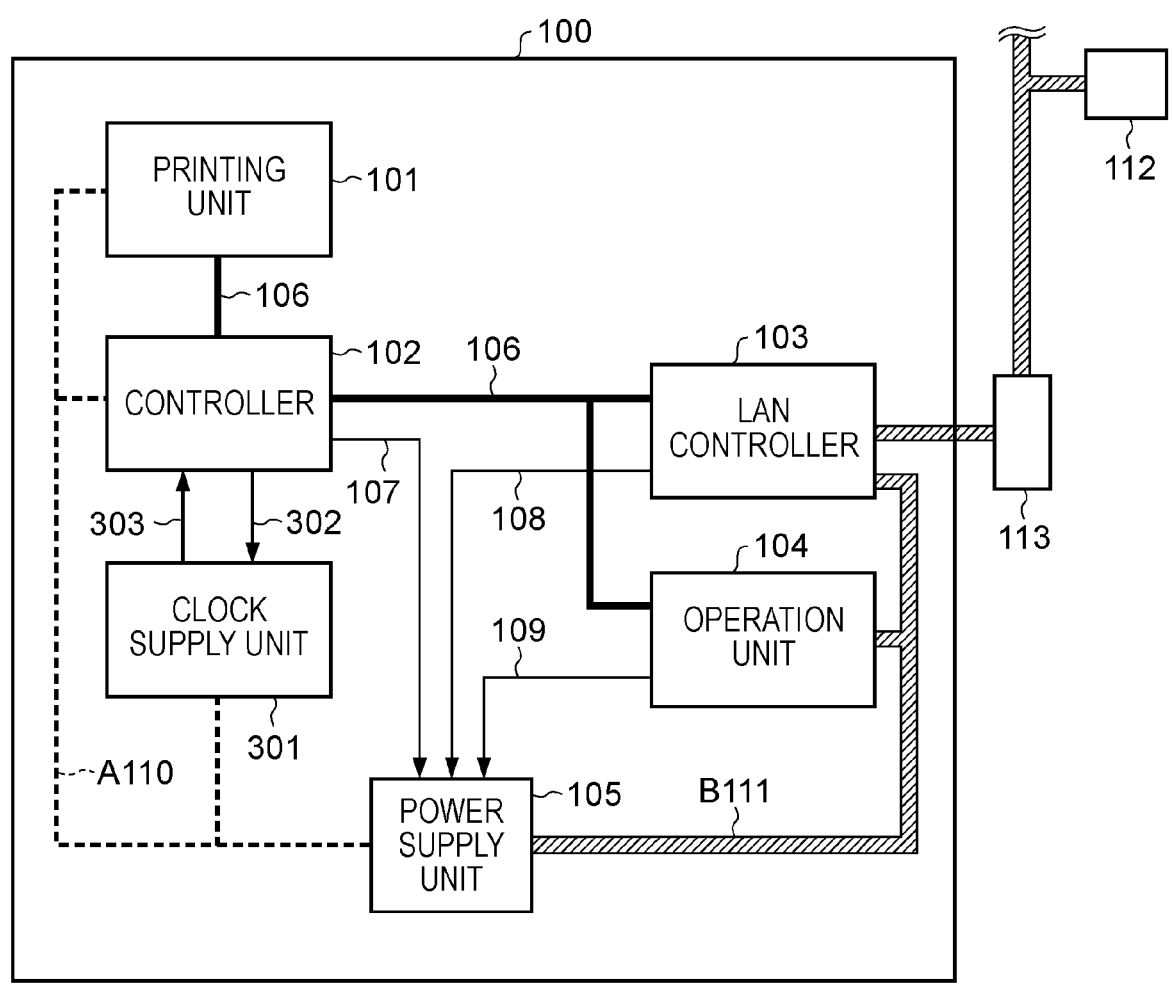
FIG. 3 is a block diagram showing an example structure of a printer according to a second exemplary embodiment of the present invention.

FIG. 3 is a block diagram showing an example structure of the printer 100 according to a second embodiment.

The printer 100 of the second embodiment differs from that of the first embodiment in that a clock supply unit 301 is additionally provided. Portions other than the clock supply unit 301 are the same as those of the first embodiment, and descriptions thereof are omitted.

[Clock Supply Unit]

The clock supply unit 301 supplies an operation clock for operating the controller 102. On the basis of a clock frequency instruction signal 302 received from the controller 102, the clock supply unit 301 supplies one of a first clock signal at a high frequency and a second clock signal at a low frequency as a clock signal 303 to the controller 102. The power consumption of the controller 102 is larger when the first clock signal is supplied thereto than when the second clock signal is supplied thereto.

[Exemplary Operation of Printer]

Next, the operation of the printer 100 will be described with reference to FIGS. 4A and 4B.

Figures 4, 4A:
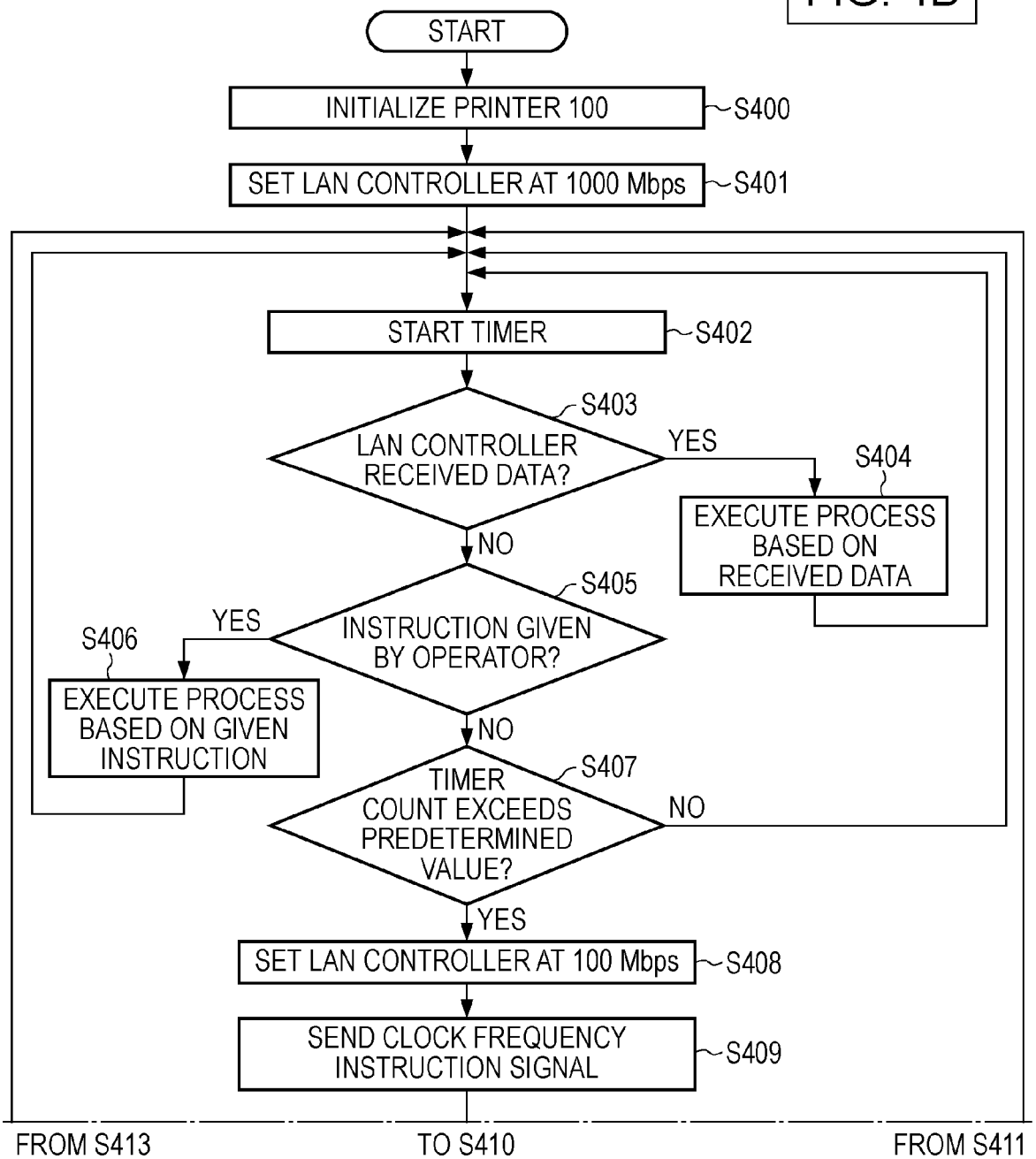
FIGS. 4A and 4B are a flowchart describing an example operation of the printer according to the second embodiment.
Figure 4B:
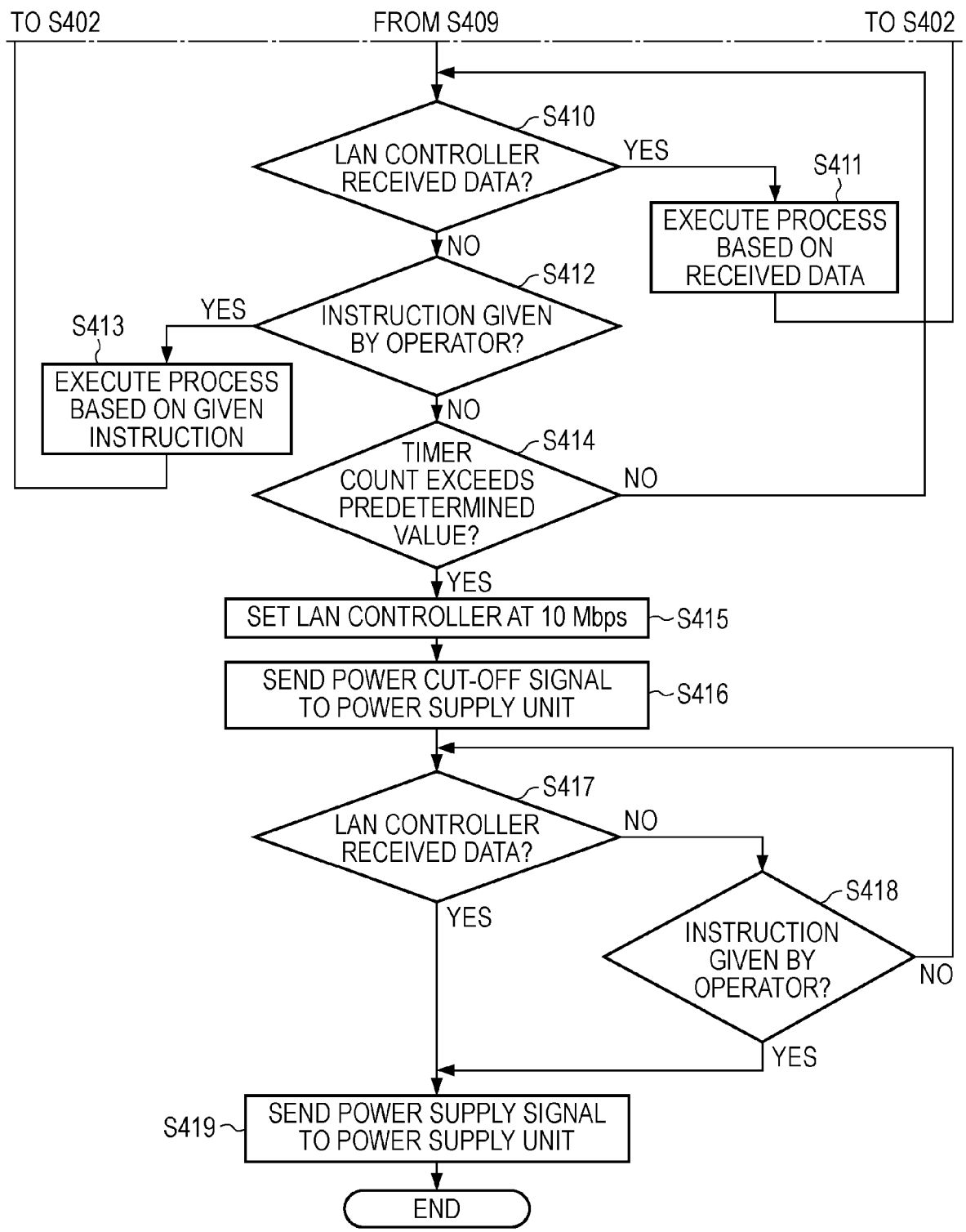

The flowchart shown in FIGS. 4A and 4B shows the operation performed when the controller 102 executes a control program stored in a ROM (not shown) included in the controller 102. Steps S417 to S419 are performed when power supply to the controller 102 is cut off. The operation in steps S417 to S419 is executed by the LAN controller 103 or the operation unit 104.

The printer 100 starts operating when a power switch (not shown) of the printer 100 is turned on, thereby supplying power from an external commercial power supply (not shown) to the power supply unit 105. After the power switch is turned on, the power supply unit 105 supplies power to the components (the printing unit 101, the controller 102, the LAN controller 103, the operation unit 104, and the clock supply unit 301) via the power supply line A110 and the power supply line B111.

Having received power supplied from the power supply unit 105 via the power supply line A110, the controller 102 in step S400 sends, via the internal bus 106, an initialization command for allowing the components of the printer 100 to execute an initialization operation. The components (the printing unit 101, the LAN controller 103, the operation unit 104, and the clock supply unit 301) receive the initialization command from the controller 102 via the internal bus 106 and execute the initialization operation. In its initialized state, the clock supply unit 301 supplies the first clock signal at a high frequency to the controller 102.

In step S401, the controller 102 instructs the LAN controller 103 via the internal bus 106 to set the LAN controller 103 at the highest communication speed. Since the LAN controller 103 can perform communication at three speeds, namely, 10 Mbps, 100 Mbps, and 1000 Mbps, the LAN controller 103 is set at 1000 Mbps.

In step S402, the controller 102 starts counting using a timer included in the controller 102. In step S403, the controller 102 determines whether the LAN controller 103 has received data from an external apparatus such as the communication apparatus 112. When the LAN controller 103 has received data, the flow proceeds to step S404. Otherwise, the flow proceeds to step S405.

In step S404, the controller 102 executes a process in accordance with the data received by the LAN controller 103 from the external apparatus such as the communication apparatus 112.

When printing data is received from the communication apparatus 112, the controller 102 executes the following process. At first, the controller 102 analyzes the printing data received via the LAN controller 103 and converts the printing data into image data that can be printed by the printing unit 101. The controller 102 then transfers the image data to the printing unit 101. Having received the image data from the controller 102, the printing unit 101 forms an image on a sheet on the basis of the received image data.

In contrast, when a status request is received from the communication apparatus 112, the controller 102 executes the following process. At first, the controller 102 analyzes the contents of the status request received via the LAN controller 103. When the contents of the status request are requesting transmission of information about the operating status of the printing unit 101, the controller 102 asks the printing unit 101 about the operating status of the printing unit 101. When the controller 102 receives a reply to the inquiry from the printing unit 101, the controller 102 requests the LAN controller 103 to send the received reply to the communication apparatus 112.

After performing step S404, the controller 102 is controlled to return to step S402 and perform step S402 again.

In step S405, the controller 102 determines whether an instruction is given by the operator of the printer 100 to the operation unit 104. If such an instruction is given, the flow proceeds to step S406. Otherwise, the flow proceeds to step S407.

In step S406, the controller 102 executes a process in accordance with the contents of the instruction given by the operator of the printer 100 to the operation unit 104. After performing step S406, the controller 102 is controlled to return to step S402 and perform step S402 again.

In step S407, the controller 102 determines whether the value counted by the counter, which has been started in step S402, exceeds a predetermined value. If the counter value exceeds the predetermined value, the flow proceeds to step S408. Otherwise, the flow returns to step S402. The controller 102 performs such determination to allow the printer 100 to enter a first power saving mode from the normal power mode. In the normal power mode, power is supplied via the power supply line A110 and the power supply line B111 to the components, and the clock supply unit 301 supplies the first clock signal at a high frequency to the controller 102. In the first power saving mode, power is supplied via the power supply line A110 and the power supply line B111 to the components, but the clock supply unit 301 supplies the second clock signal at a low frequency to the controller 102. The components of the printer 100 include the printing unit 101, the controller 102, the LAN controller 103, the operation unit 104, and the clock supply unit 301. When the printer 100 does not operate for a predetermined period of time, the mode of the printer 100 is changed from the normal power mode to the first power saving mode. This reduces power consumed by the printer 100. The operating frequency of the clock signal supplied to the controller 102 in the first power saving mode is lower than that supplied in the normal power mode. However, power supply to the controller 102 is not cut off in the first power saving mode. When the counter in the controller 102 counts one every minute, and when the above-described predetermined value is set to 15, for example, the operation mode is switched from the normal power mode to the first power saving mode when the printer 100 does not operate for 15 minutes.

In step S408, the controller 102 sets the LAN controller 103 at an intermediate communication speed (100 Mbps) prior to changing the operation mode of the printer 100 to the first power saving mode. As has been described above, the LAN controller 103 can communicate at three speeds, namely, 10 Mbps, 100 Mbps, and 1000 Mbps. In contrast, the higher the communication speed set for the LAN controller 103, the higher the power consumption. In the normal power mode, the time required to receive data (e.g., printing data) from the communication apparatus 112 is reduced when the LAN controller 103 is set at a high communication speed, which contributes to increasing the operation speed. In the power saving mode, however, such a high communication speed requires higher power consumption, which causes adverse effects on saving power.

In step S408, the controller 102 instructs the LAN controller 103 via the internal bus 106 to change the setting of the communication speed of the LAN controller 103 from 1000 Mbps in the normal power mode to 100 Mbps in the first power saving mode. Having received the instruction to change the speed from the controller 102, the LAN controller 103 changes the communication speed from 1000 Mbps to 100 Mbps.

More specifically, when the LAN controller 103 receives the instruction from the controller 102 to change the speed from 1000 Mbps to 100 Mbps, the LAN controller 103 requests the switching hub 113 to break a communication link at the current communication speed (1000 Mbps). When the LAN controller 103 determines that the communication link at 1000 Mbps with the switching hub 113 is broken, the LAN controller 103 requests the switching hub 113 to establish a new communication link at 100 Mbps. With this operation, the speed of communication between the LAN controller 103 and the switching hub 113 is changed from 1000 Mbps to 100 Mbps.

In step S409, the controller 102 sends the clock frequency instruction signal 302 to the clock supply unit 301 to change the operation clock of the controller 102 to a low frequency. Having received the clock frequency instruction signal 302, the clock supply unit 301 changes the clock signal 303 to be supplied to the controller 102 from the first clock signal at a high frequency to the second clock signal at a low frequency. With this change, the power consumed by the controller 102 is reduced.

In step S410, the controller 102 determines whether the LAN controller 103 has received data from the external apparatus, such as the communication apparatus 112. If data has been received, the flow proceeds to step S411. Otherwise, the flow proceeds to step S412.

In step S411, the controller 102 executes a process in accordance with the data received by the LAN controller 103 from the external apparatus, such as the communication apparatus 112.

When printing data is received from the communication apparatus 112, the controller 102 executes the following process. At first, the controller 102 analyzes the printing data received via the LAN controller 103 and converts the printing data into image data that can be printed by the printing unit 101. The controller 102 then transfers the image data to the printing unit 101. Having received the image data from the controller 102, the printing unit 101 forms an image on a sheet on the basis of the received image data.

In contrast, when a status request is received from the communication apparatus 112, the controller 102 executes the following process. At first, the controller 102 analyzes the contents of the status request received via the LAN controller 103. When the contents of the status request are requesting transmission of information about the operating status of the printing unit 101, the controller 102 asks the printing unit 101 about the operating status of the printing unit 101. When the controller 102 receives a reply to the inquiry from the printing unit 101, the controller 102 requests the LAN controller 103 to send the received reply to the communication apparatus 112.

After performing step S411, the controller 102 is controlled to return to step S402 and perform step S402 again.

In step S412, the controller 102 determines whether the operator of the printer 100 has given an instruction to the operation unit 104. If such an instruction is given, the flow proceeds to step S413. Otherwise, the flow proceeds to step S414.

In step S413, the controller 102 executes a process in accordance with the contents of the instruction given by the operator of the printer 100 to the operation unit 104. After performing step S413, the controller 102 is controlled to return to step S402 and perform step S402 again.

In step S414, the controller 102 determines whether the value counted by the counter, which has been started in step S402, exceeds a predetermined value. If the counter value exceeds the predetermined value, the flow proceeds to step S415. Otherwise, the flow returns to step S410. The controller 102 performs such determination to allow the printer 100 to enter a second power saving mode from the first power saving mode. In the second power saving mode, power is supplied via the power supply line B111 to the LAN controller 103 and the operation unit 104, although no power is supplied via the power supply line A110 to the printing unit 101, the controller 102, and the clock supply unit 301. When the printer 100 does not operate for a predetermined period of time, the mode of the printer 100 is changed from the first power saving mode to the second power saving mode. This further reduces power consumed by the printer 100. When the counter in the controller 102 counts one every minute, and when the above-described predetermined value is set to 30, for example, the operation mode is switched from the first power saving mode to the second power saving mode when the printer 100 does not operate for 30 minutes.

In step S415, the controller 102 sets the LAN controller 103 at a lower communication speed prior to changing the operation mode of the printer 100 to the second power saving mode. As has been described above, the LAN controller 103 can communicate at three speeds, namely, 10 Mbps, 100 Mbps, and 1000 Mbps. In contrast, the higher the communication speed set for the LAN controller 103, the higher the power consumption. In the first power saving mode, the time required to receive data (e.g., printing data) from the communication apparatus 112 is reduced when the LAN controller 103 is set at an intermediate communication speed, which contributes to increasing the operation speed to some extent. In the second power saving mode, however, such an intermediate communication speed requires higher power consumption, which causes adverse effects on saving power.

In step S415, the controller 102 instructs the LAN controller 103 via the internal bus 106 to change the setting of the communication speed of the LAN controller 103 from 100 Mbps in the first power saving mode to 10 Mbps in the second power saving mode. Having received the instruction to change the speed from the controller 102, the LAN controller 103 changes the communication speed from 100 Mbps to 10 Mbps.

More specifically, when the LAN controller 103 receives the instruction from the controller 102 to change the speed from 100 Mbps to 10 Mbps, the LAN controller 103 requests the switching hub 113 to break a communication link at the current communication speed (100 Mbps). When the LAN controller 103 determines that the communication link with the switching hub 113 at 100 Mbps is broken, the LAN controller 103 requests the switching hub 113 to establish a new communication link at 10 Mbps. With this operation, the speed of communication between the LAN controller 103 and the switching hub 113 is changed from 100 Mbps to 10 Mbps.

In step S416, the controller 102 sends the power cut-off signal 107 to the power supply unit 105 to change the mode of the printer 100 from the first power saving mode to the second power saving mode. Having received the power cut-off signal 107 from the controller 102, the power supply unit 105 stops supplying power to the printing unit 101, the controller 102, and the clock supply unit 301 via the power supply line A110.

To reduce the power consumption in the second power saving mode than that in the first power saving mode, the printer 100 according to the second embodiment is designed to cut off power supply to the controller 102, which is configured to control the overall printer 100. The printer 100 according to the second embodiment reduces power consumption by reducing the communication speed of the LAN controller 103 in the first and second power saving modes to be less than that in the normal power mode. In this manner, to achieve a reduction in power consumption of both the controller 102 and the LAN controller 103, the controller 102 changes the communication speed of the LAN controller 103 in step S415 and then sends the power cut-off signal 107 in step S416. For example, when the controller 102 tries to perform step S416 prior to step S415, power supply to the controller 102 is cut off in step S416, and hence, the controller 102 cannot perform step S415. According to the second embodiment, a reduction in power consumption of both the controller 102 and the LAN controller 103 in the power saving modes can be achieved.

After the printer 100 enters the second power saving mode, it is determined whether a condition for the printer 100 to return from the second power saving mode to the normal power mode is satisfied.

More specifically, when the LAN controller 103 receives data from the external apparatus such as the communication apparatus 112 in step S417, the flow proceeds to step S419. Otherwise, the flow proceeds to step S418.

When the LAN controller 103 receives in step S418 an instruction given by the operator of the printer 100 to the operation unit 104, the flow proceeds to step S419. Otherwise, the flow returns to step S417.

In step S419, the LAN controller 103 or the operation unit 104 sends the power supply signal 108 or the power supply signal 109 to the power supply unit 105. The power supply unit 105 receives the power supply signal 108 or the power supply signal 109 and restarts supplying power to the printing unit 101, the controller 102, and the clock supply unit 301 via the power supply line A110. This flow ends here, and a new flow starts. Specifically, after a request to restart supplying power to the controller 102 is made in step S419, the flow from step S400 onward is performed again. That is, the controller 102 changes the communication speed, which has been set to the low speed (10 Mbps) in the second power saving mode, to the high speed (1000 Mbps) in accordance with the fact that the printer 100 has returned to the normal power mode (S401). Specifically, when the LAN controller 103 receives an instruction from the controller 102 to change the speed to 1000 Mbps, the LAN controller 103 requests the switching hub 113 to break a communication link at the current communication speed (10 Mbps). When the LAN controller 103 determines that the communication link with the switching hub 113 at 10 Mbps is broken, the LAN controller 103 requests the switching hub 113 to establish a new communication link at 1000 Mbps. With this operation, the speed of communication between the LAN controller 103 and the switching hub 113 is changed from 10 Mbps to 1000 Mbps.

As has been described above, according to the second embodiment, when it is determined to change the mode from the normal power mode to the first power saving mode, the controller 102 gives an instruction to the LAN controller 103 to reduce the communication speed. In addition, the controller 102 outputs an instruction to the clock supply unit 301 to reduce the frequency of the clock signal for operating the controller 102. Accordingly, in the first power saving mode, while the power supply to the controller 102 is maintained, the power consumption is reduced from that in the normal power mode.

According to the second embodiment, when it is determined to change the mode from the first power saving mode to the second power saving mode, the controller 102 gives an instruction to the LAN controller 103 to further reduce the communication speed. In addition, after the controller 102 gives an instruction to the power supply unit 105, the power supply unit 105 cuts off power supply to the controller 102.

Accordingly, before the mode is changed to the second power saving mode, the communication speed for communicating with the other communication apparatus is reduced to a lower speed. In the second power saving mode, the power consumption can be minimized by cutting off power supply to a portion that gives an instruction to reduce the communication speed.

Objects of the present invention can be achieved such that a system or apparatus is supplied with a storage medium storing a program code of software implementing the functions in the above-described embodiments, and a computer in the system or apparatus reads and executes the program code stored on the storage medium. In this case, the program code read from the storage medium implements the functions in the embodiments, and the storage medium storing the program code constitutes an aspect of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-107717 filed Apr. 10, 2006, which is hereby incorporated by reference herein in its entirety.

What is claimed:

1. A communication apparatus comprising:
   a communication unit configured to communicate with an external apparatus via a network at any one of a plurality of communication speeds;
   a controller configured to at least give an instruction to the communication unit, the instruction specifying which one of the communication speeds the communication unit should communicate at, and to determine whether to allow the communication apparatus to change a power mode from a first power mode in which the power is supplied to the controller to a second power mode in which the power is not supplied to the controller; and
   a power supply unit configured to supply power to the controller,
   wherein the power supply unit cuts off power supply to the controller when the controller determines to allow the communication apparatus to change the power mode from the first power mode to the second power mode and gives an instruction to the communication unit to reduce the communication speed.

2. The communication apparatus according to claim 1, further comprising an output unit configured to output a return instruction to the power supply unit to return from the second power mode to the first power mode,
   wherein the power supply unit restarts supplying power to the controller in response to reception of the return instruction from the output unit.

3. The communication apparatus according to claim 2, wherein the controller gives an instruction to increase the communication speed in response to the restarting of power supply in response to the return instruction.

4. The communication apparatus according to claim 2, wherein the output unit outputs the return instruction to the power supply unit in response to reception of data by the communication unit from the external apparatus in the second power mode.

5. The communication apparatus according to claim 2, further comprising an operation unit configured to receive an instruction given by an operator of the communication apparatus,
   wherein the output unit outputs the return instruction to the power supply unit in response to reception of the instruction, which is given by the operator, by the operation unit in the second power mode.

6. The communication apparatus according to claim 1, further comprising a printing unit configured to perform a printing process on the basis of printing data received by the communication unit from the external apparatus.

7. The communication apparatus according to claim 6, wherein the power supply unit supplies power to the printing unit in the first power mode and does not supply power to the printing unit in the second power mode.

8. The communication apparatus according to claim 1, wherein the controller determines whether to allow the communication apparatus to change the power mode from a third power mode in which power consumption is higher than that in the first power mode to the first power mode, and
   wherein the controller gives an instruction to reduce the communication speed when the controller determines to allow the communication apparatus to change the power mode from the third power mode to the first power mode.

9. The communication apparatus according to claim 8, further comprising a clock supply unit configured to supply a clock signal for operating the controller,
   wherein the controller gives an instruction to reduce the frequency of the clock signal, which is supplied from the clock supply unit to the controller, when the controller determines to allow the communication apparatus to change the power mode from the third power mode to the first power mode.

10. The communication apparatus according to claim 8, wherein the controller determines to allow the communication apparatus to change the power mode from the third power mode to the first power mode when the communication apparatus does not operate for a predetermined period of time in the third power mode.

11. The communication apparatus according to claim 1, wherein the controller determines to allow the communication apparatus to change the power mode from the first power mode to the second power mode when the communication apparatus does not operate for a predetermined period of time in the first power mode.

* * * * *